Sept. 17, 1935.  J. T. NEEDHAM  2,014,449
METHOD OF MAKING CARRIERS FOR PNEUMATIC DISPATCH TUBE SYSTEMS
Original Filed Aug. 31, 1932
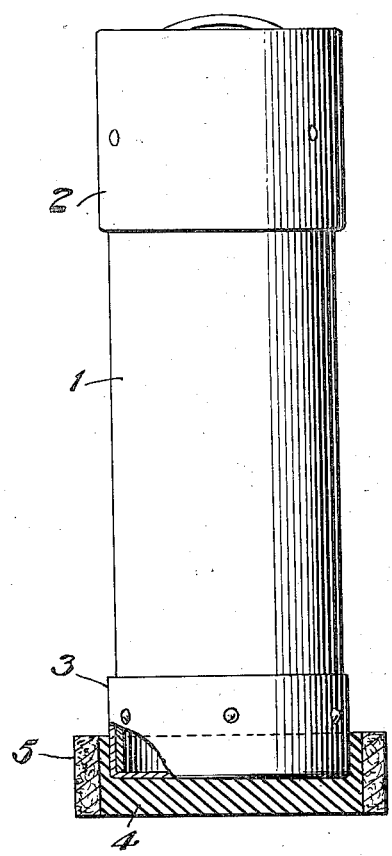
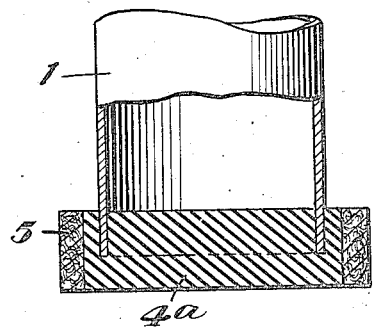
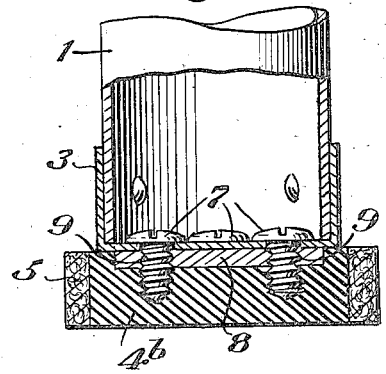
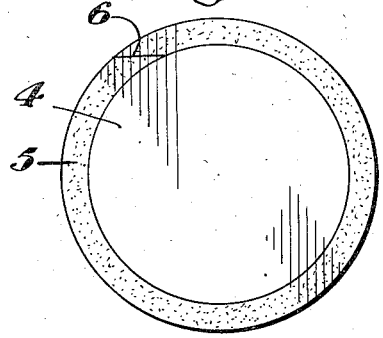
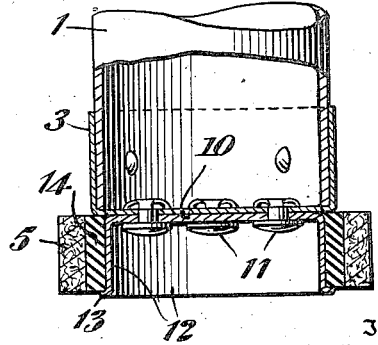
Inventor
John T. Needham
By
Davis Davis
Attorneys

Patented Sept. 17, 1935

2,014,449

UNITED STATES PATENT OFFICE

2,014,449

METHOD OF MAKING CARRIERS FOR PNEUMATIC DISPATCH TUBE SYSTEMS

John T. Needham, North Plainfield, N. J.

Original application August 31, 1932, Serial No. 631,184. Divided and this application May 11, 1933, Serial No. 670,427

11 Claims. (Cl. 18—59)

Heretofore the buffer head of a carrier has been made of a disk of dense felt. Such a head is costly and, besides, the felt disk absorbs much moisture of condensation in the dispatch tubing. The saturation of the felt head with moisture objectionably increases the weight of the carrier and also causes the head to expand to such a degree as to impede the travel of the carrier. These felt buffer heads are usually attached to a closed end of the carrier body by rivets or screws or other suitable fastening means.

This invention relates more particularly to improvements in the buffer heads and bearing rings for pneumatic dispatch tube carriers and to the method of attaching the improved buffer heads and bearing rings to the carriers.

An important object of the invention is to provide a simple, inexpensive and efficient method of securing a felt bearing or guiding ring to the carrier body by interposing rubber or a similar material in a plastic state within the bearing ring of felt and then molding and vulcanizing the plastic material to the ring and to the carrier, the vulcanizing operation serving the two purposes of permanently fixing the felt ring to the rubber and permanently fixing the vulcanized rubber to the carrier.

Other objects of the invention will appear hereinafter.

This application is a division of my co-pending application, Serial No. 631,184, filed August 31, 1932.

In the drawing, Fig. 1 is a sectional elevation of a carrier equipped with one form of the improved buffer head;

Fig. 2 a face view of the buffer head of Fig. 1; and

Figs. 3, 4 and 5 sectional views showing different modifications of the buffer head.

Referring to Figs. 1 and 2, one form of the improved buffer head is shown mounted upon the tubular container body of a carrier employed for carrying message sheets in a pneumatic dispatch tube. The carrier body comprises a tubular body section 1, a sleeve section 2 fixed to one end of said body section and a cup-shaped cap section 3 fitted over the opposite end of the body section, closing it and fixed thereto. The sections may be made of metal, hard fiber, hard rubber or other suitable material. The buffer head is secured to the cup-shaped cap section 3 and is of composite construction. It includes a moisture-impervious core comprising a flat, circular disk 4 of rather soft resilient rubber. This disk is encircled by a bearing and guiding ring 5 of dense felt of the kind usually employed in the buffer heads of carriers. The felt ring forms a facing for the periphery of the rubber disk and is secured thereto. The diameter of the rubber disk exceeds that of the cup-shaped end section 3 of the carrier body, and, at one face, the disk is recessed to receive the bottom portion of said section. The containing space of the carrier body extends into said recess and by insetting the body in the buffer head the overall length of the carrier is reduced without reducing the carrier capacity.

For cheapness I prefer that the felt ring 5 be formed from a straight strip of felt which may be cut from sheet stock. The ends of the strip are feathered, the strip is curled into circular form and the feathered ends are overlapped and cemented together, as at 6. A rubber compound suitable for vulcanizing and preferably in a plastic state, is placed in the felt ring and the end of the carrier is embedded therein, as shown in Fig. 1. The carrier and the rubber compound and the encircling bearing ring of felt are then placed in a suitable mold and subjected to the usual vulcanizing process. The molding and vulcanizing of the rubber within the felt ring and around the end of the carrier body intimately and permanently unites the rubber around the entire interior surface of the ring and interlocks it with the fibers of the felt, and intimately and permanently affixes the rubber to the carrier body and forms an integral, durable buffer head structure. The rubber core is vulcanized to a sufficient degree to render the buffer head moderately compressible and resilient, but of sufficient strength and solidity to withstand the jars and shocks of service. A composite buffer head so constructed is very much cheaper than a solid felt disk and, owing to the material reduction in the amount of felt employed, it absorbs much less moisture.

Fig. 3 shows another mounting of the composite buffer head. Here the end cap of the carrier body is omitted and the rubber core 4a serves to close the end of the tubular body section 1. The felt bearing and guiding ring is placed in a suitable mold and the rubber in a plastic state is placed within the ring. The open end of the carrier is then embedded in the plastic rubber and subjected to the usual vulcanizing process, whereby the rubber is molded and vulcanized around the carrier end and to the felt bearing and guiding ring. The vulcanizing operation permanently unites the rubber to the felt ring and permanently fixes the rubber to the carrier body. The rubber core forms a permanent moisture impervious closure for the end of the carrier body.

Fig. 4 shows the buffer head secured to the end cap 3 of the carrier by headed screws 7. At its face opposed to the cap the rubber core 4b has embedded therein a metal disk 8. The latter has threaded screw holes 9 registering with unthreaded screw holes in the cap. The screws are inserted from the interior of the carrier, through the unthreaded holes in the cap and screwed through the threaded holes 9 in the disk 8 and into the rubber core 4b. The rubber, by its frictional engagement with the screw threads, effectively locks the screws and prevents unscrewing. In making up this form of buffer head the felt ring is placed in a suitable mold and filled with plastic rubber. The plate 8 is embedded in the rubber to be flush with one outer face of the head and then the rubber is subjected to the usual vulcanizing process. The plate 8 is thereby permanently affixed and embedded in the rubber and the rubber is intimately and permanently united with the felt ring.

In Fig. 5 the buffer head is held to the carrier body through a metal cup-shaped end member 10 having its bottom abutting the cap 3 and riveted thereto as at 11. Said member forms an outwardly projecting annular flange 12 having a slight lateral flange 13 at its outer edge. A compressible rubber cushion ring 14 encircles the flange 17 and the felt facing ring 5 encircles said rubber ring. The rubber is molded and vulcanized to fix it intimately and permanently to the felt facing ring and to the flanges 12 and 13. If desired said flanges may be made slightly compressible and resilient for additional cushioning effect.

While I prefer to use ordinary commercial rubber composition suitable for vulcanizing it is to be understood that any suitable material may be used which will form a tough, resilient, moisture-proof and moldable core for the bearing ring. While I prefer to use ordinary commercial felt such as is now used in buffer heads of pneumatic dispatch tube carriers it is to be understood that I may use any material which will serve as an efficient bearing ring for the carrier and which may be intimately united with the carrier body, or buffer head body by molding or vulcanization.

What I claim is:

1. The method of manufacturing pneumatic dispatch tube carriers, comprising applying plastic rubber compound to the body of the carrier, enclosing said plastic rubber with a felt bearing ring, and vulcanizing the plastic rubber to make it tough and resilient and to intimately and permanently unite it with the carrier and with the felt bearing ring.

2. The method of manufacturing pneumatic dispatch tube carriers, comprising applying rubber compound to one end of the carrier body to form a buffer head, enclosing said rubber within a felt bearing ring, and vulcanizing the rubber to make it tough and resilient and to intimately and permanently unite it with the carrier and with the felt bearing ring.

3. The method of manufacturing pneumatic dispatch tube carriers, comprising assembling a carrier body, a peripheral bearing ring of compressible fibrous material and a mass of rubber compound in concentric relation, with the rubber compound surrounded by said ring, and molding and vulcanizing said mass to and around the inner surface of the ring and to and around the periphery of the carrier body to intimately secure the mass to the ring and to the carrier body.

4. The method of manufacturing pneumatic dispatch tube carriers, comprising applying rubber to a portion of a carrier body, surrounding said rubber with a peripheral bearing ring of compressible fibrous material, and securing said rubber intimately to and around the inner surface of said ring and to and around the periphery of said portion of the carrier body by molding and vulcanization.

5. The method of manufacturing pneumatic dispatch tube carriers, comprising placing a charge of rubber compound within a peripheral bearing ring of compressible fibrous material, establishing mutual contact between said charge of rubber compound and a portion of the carrier body, molding the charge to said portion of the carrier body and to the ring, and vulcanizing the charge to render it tough compressible and resilient, whereby the mass will be secured intimately to said portion of the carrier body and to the bearing ring.

6. The method of manufacturing pneumatic dispatch tube carriers, comprising placing a charge of rubber compound within a peripheral bearing ring of compressible fibrous material, establishing mutual contact between an open end portion of a carrier body and said charge of rubber compound with the material of the charge extending across the opening in said end portion, and molding and vulcanizing the charge to and around the inner surface of the ring and to and around the periphery of said end portion and across the opening to secure the rubber compound intimately to the ring and said end portion and also cause it to form a permanent closure for the end opening.

7. The method of manufacturing pneumatic dispatch tube carriers, comprising cutting a strip of compressible fibrous material from flat sheet stock, curling said strip to form a peripheral bearing ring, charging the space enclosed by said ring with a rubber compound, establishing mutual contact between said rubber compound and a portion of the carrier body, and molding and vulcanizing the rubber compound to secure it intimately to said portion of the carrier body and to and around the inner surface of the ring.

8. The method of manufacturing pneumatic dispatch tube carriers, comprising cutting a strip of felt from flat sheet stock, curling said strip to form a peripheral bearing ring, placing said ring within a mold, charging the space enclosed by said ring with a rubber compound, establishing mutual contact between the rubber compound and a portion of the carrier body, and molding and vulcanizing the rubber compound to intimately secure it to and around said portion of the carrier body and to and around the inner surface of the ring.

9. The method of manufacturing pneumatic dispatch tube carriers, comprising charging a rubber compound within a peripheral bearing ring of compressible fibrous material, establishing mutual contact between said rubber compound and a cup-like end portion of a carrier body, and molding and vulcanizing the rubber compound to secure it intimately to and around the periphery of said cup-like end portion and to and around the inner surface of the ring.

10. The method of manufacturing pneumatic dispatch carriers, comprising placing within a mold a peripheral bearing ring of compressible fibrous material, placing within the space enclosed by said ring a charge of rubber, and molding said charge to a carrier body and to and around the interior of said ring to secure the ring to the carrier body.

11. The method of manufacturing pneumatic dispatch carriers, comprising providing a peripheral bearing ring of compressible fibrous material, placing within the space enclosed by said ring a charge of rubber, and molding said charge to a carrier body and to and around the interior of said ring to secure the ring to the carrier body.

JOHN T. NEEDHAM.